United States Patent Office 3,303,879
Patented Feb. 14, 1967

3,303,879
STABLE AQUEOUS TREATING LIQUID FOR
PERMEABLE EARTH FORMATIONS
Sherrod A. Williams, Jr., Dallas, Tex., assignor to Mobil
Oil Corporation, a corporation of New York
No Drawing. Filed Sept. 28, 1964, Ser. No. 399,888
25 Claims. (Cl. 166—9)

This invention relates to flow of an aqueous liquid in a permeable earth formation. Particularly, this invention pertains to a method of treating subterranean formations by flowing into the formations an aqueous flooding liquid. More particularly, this invention is directed to improving the recovery of oil from a subterranean formation by flowing therethrough an aqueous solution.

The oil accumulated in subterranean formations is recovered or produced therefrom through wells drilled into the subterranean formations. A large amount of the oil is left in a subterranean formation if produced only by primary depletion, i.e., by employing only initial formation energy to recover the oil. Supplemental operations, often referred to as secondary recovery operations, are used to improve the extent of recovery. In certain of these supplemental recovery operations, a fluid is injected through at least one well, called an injection well, and passed into the formation. Oil is displaced from and is moved through the formation and is produced from another well, called a production well, or wells, as the injected fluid passes from the injection well toward the production wells. In a particular recovery operation of this sort, water is employed as the injected fluid and the operation is often referred to as a waterflood and the water is often referred to as the flooding liquid.

Two major types of sweep efficiency, i.e., macroscopic, or areal, sweep efficiency and microscopic sweep efficiency, influence the effectiveness of the passage of the injected fluid through the formation.

The first type, the macroscopic sweep efficiency, is most seriously affected by permeability stratification of the subterranean formation and by the difference between the viscosity of the in-situ oil and the injected fluid. In any operation in which a fluid is injected through an injection well into a subterranean formation, permeability stratification is significant, and it is most significant in secondary recovery operations. By causing a disproportionately large amount of the injected fluid to enter the more permeable zones, this stratification results in premature production of the injected fluid at the production wells. The premature production is referred to as premature breakthrough and manifests itself as an increasing ratio of the injected fluid to the oil in the produced fluids. Thus, premature breakthrough can render an otherwise well-engineered recovery project relatively uneconomical, because of the cost of treating and recycling of injected fluid.

Where the viscosity of the injected fluid is markedly less than the viscosity of the in-situ oil, a situation referred to as instability is created. In this situation, the less viscous injected fluid tends to develop fingers or bulges which may be caused by points of minute inhomogeneity in the formation. These fingers grow and travel at a much faster rate than the remainder of the injected fluid, and thus also cause premature breakthrough.

Various means have been proposed to improve macroscopic sweep efficiency and thereby avoid premature breakthrough. Selective plugging operations have been taught to correct permeability stratification. Viscosity gradation, wherein a liquid or liquids having a viscosity between that of the injected fluid and that of the in-situ oil is injected into the formation prior to the injected fluid, is taught to cure or minimize instability fingering. One method which has been taught to correct both the permeability stratification and the instability fingering involves the use of a thickener in the leading edge of the flooding or displacing liquid comprising one of the injected fluids. More specifically, it has been taught to add thickeners to the leading edge of a waterflood, i.e., a recovery operation wherein the injected displacing liquid is water.

The second type of sweep efficiency, the microscopic sweep efficiency, is influenced by the interfacial tension between the injected fluid and the in-situ oil, by the contact angle measured between the oil-injected fluid interface and the solid surface, and by the permeability of the formation. To achieve improved microscopic sweep efficiency, it has been taught to add a surfactant to an injected fluid to decrease the interfacial tension and to alter the contact angle. Available methods of altering permeability, such as fracturing or acidizing, are of limited benefit in improving microscopic sweep efficiency since they do not affect to any great extent the over-all permeability of the formation but rather create only localized flow channels of high permeability.

Despite experimental and field use of the foregoing additives and methods, much oil continues to remain in a subterranean formation after the best recovery mechanisms heretofore known have been employed.

Therefore, it is an object of this invention to provide a method for treating a subterranean formation by evening out injection and flow profiles in a subterranean formation.

It is another object of this invention to provide a method for benefiting the distribution pattern of any other fluids injected concurrently, alternately, or subsequently.

It is another object of the invention to provide a method for recovering oil from an oil-containing subterranean formation by passing through the formation a flooding water which will increase both the macroscopic and microscopic sweep efficiencies of the flooding operation.

It is another object of the invention to provide a method for decreasing the flow of flooding water in more permeable domains relative to flow in less permeable domains of a subterranean formation.

Further objects and attendant advantages of the invention will be apparent from the description hereinafter.

In accordance with the invention, in the treatment of a permeable subterranean formation, there is passed into the formation through an injection well, water having incorporated therein a quantity sufficient to provide a solution which is viscoelastic and which is also a shear hardening, positive nonsimple liquid of an additive system comprising either (1) alkali metal soap of tall oil acid and a salt which forms a strong electrolyte in water, (2) ammonium soap of tall oil acid and a material which forms at least a weak electrolyte in water, or (3) an amine soap of tall oil acid, often referred to as a substituted ammonium soap of tall oil acid. In a specific aspect of the invention in the recovery of oil from a subterranean formation by injecting a flooding liquid through an injection well and into the formation and producing oil from the formation through a production well, there is employed, as the flooding liquid, water incorporating one of the above additive systems in a quantity sufficient to provide a viscoelastic solution which is also a shear hardening, positive nonsimple liquid. The solutions containing the additive systems will be hereinafter termed "the active solutions." The reasons why the solutions are so termed will later become apparent.

A viscoelastic liquid is a liquid which possesses both elastic and viscous properties. Viscoelastic liquids have a characteristic viscosity function, which function may or may not be dependent on rate of shear or stress. They also exhibit elasticity of shape and a retarded elastic recovery in deformation. A viscoleastic liquid may be a solution comprising one or more solvents containing one or more solutes.

In laminar flow of a viscoelastic liquid, components of stress which are normal as well as tangential to the direction of the stress frequently develop and secondary flow effects appear. Thus, the normal stresses in a viscoelastic liquid flowing in a circular conduit cause an appreciable axial tension to develop. When the flowing liquid emerges from a circular conduit, the tension in the streamlines relaxes, with the result that the liquid stream swells to a diameter in excess of the diameter of the conduit. Accordingly, the liquid leaving the conduit expands or bulges outwardly, forming what might be termed an enlarged bulb at the opening of the conduit.

Another characteristic of a viscoelastic liquid is its flow behavior between rotating concentric cylinders. Analysis of the complete spatial distribution of stress for a viscoelastic liquid in this situation shows that the primary phenomenon is the appearance of an additional tension along the streamlines. Between the rotating concentric cylinders, the streamlines are circles and the tension becomes a hoop or strangulation stress which constricts the liquid toward the axis of rotation. As a consequence, the liquid tends to climb the rotating cylinder and a pronounced thrust develops.

Further with respect to the characteristics of a viscoelastic liquid, it can be shown by theoretical analysis that flow in rectilinear paths through conduits of arbitrary cross section under a constant pressure gradient is not always possible for certain of these liquids. Thus, if the flow conduit is noncylindrical, superimposed onto the simple rectilinear motion is a steady motion in which liquid particles follow spiral paths to develop a vortexlike motion.

Each of the properties of a viscoelastic liquid described above is of value in displacing oil from a subterranean formation. Flow of the liquid through the interstices of a subterranean formation will ordinarily be laminar. Thus, with the development of axial tension of the viscoelastic liquid upon flow from restraining portions of substantially circular interstices, or conduits, within the formation, the resulting bulging effect enables the viscoelastic liquid to displace the oil from adjacent wider portions of the interstices. The development of tension along the streamlines of flow of the viscoelastic liquid and the development of thrust by the liquid will additionally effect displacement of the oil otherwise trapped within the interstices of the formation. Furthermore, the development of vortexlike motion in the flow of the viscoelastic liquid in noncircular interstices effects a thorough displacing action by the viscoelastic liquid of the oil in the interstices.

As the name implies, a shear hardening liquid is a liquid which hardens, i.e., develops a higher viscosity, when subjected to certain rates of shear. The property of shear hardening thus enables such a liquid to develop a higher viscosity when subjected to a higher rate of shear in a subterranean formation. Such a higher rate of shear is induced in a liquid when it flows in a more permeable stratum than when it flows in parallel, i.e., under the influence of the same pressure drop, in a less permeable stratum within a subterranean formation. A shear hardening liquid thus is active in that it becomes selectively more viscous in the more permeable strata than in the less permeable strata. As a result, the rates of flow of the liquid in the more permeable and in the less permeable strata become more nearly equalized and premature breakthrough is lessened.

A positive nonsimple liquid is a liquid which has a higher viscosity when it flows in a more permeable stratum than when it flows at the same nominal rate of shear in a less permeable stratum. A positive nonsimple liquid thus is active in the sense that it adjusts its properties to flow at a rate which is relatively insensitive to the permeability of the various strata within a subterranean formation through which it is flowing. This phenomenon differs from that of shear hardening in that the positive nonsimple liquid increases in viscosity in the more permeable strata through which it is flowing even at equal rates of shear. Permeability controls whether a flowing positive nonsimple liquid becomes more viscous or not, whereas shear rate controls whether a flowing shear hardening liquid becomes more viscous or not. Both phenomena operate to achieve more nearly uniform injection and flow profiles of a positive nonsimple, shear hardening liquid passing through a subterranean formation.

The active solutions employed in the method of the invention exhibit the properties of shear hardening, positive nonsimplicity, and viscoelasticity. Through the properties of shear hardening and positive nonsimplicity, they improve the macroscopic sweep efficiency and thus enable the recovery of a greater portion of the oil from a subterranean formation before they break through at a production well. Since the active solutions are also viscoelastic, they improve the microscopic flooding efficiency as they pass through the subterranean formation.

Whether a particular liquid exhibits the properties of shear hardening, viscoelasticity, or positive nonsimplicity can be determined from its behavior in a rotational viscometer, such as a Couette-type viscometer. The viscosity of the liquid, measured as a function of the rate of shear on such a rotational viscometer at different gap sizes, indicates the existence of each of the properties. The gap size in such a viscometer is the distance separating the concentric cylinder walls immersed in the liquid whose viscosity is being measured. The curve which results from plotting the data obtained on the viscometer, e.g., plotting the viscosity as the ordinate against the shear rate as the abcissa, depicts the properties of shear hardening, viscoelasticity, or positive nonsimplicity. With a solution, if the curve representing the viscosity of the solution increases with increasing shear rates within a certain range of shear rates, the solution is a shear hardening liquid. If a liquid exhibits the previously described properties, e.g., (1) upon emergence from a conduit swelling to a diameter in excess of the diameter of the conduit, or (2) climbing a cylinder rotating therein, it is viscoelastic. Further tests for determining whether a liquid is viscoelastic or not may be found in a number of published books discussing the phenomenon, e.g., "Viscoelastic Properties of Polymers," J. D. Ferry, Wiley Publishing Co., New York, 1961. If the curve representing the viscosity of the solution is higher than that of the solvent at certain shear rates using a particular gap size on the viscometer and is higher still at the same shear rates using a larger gap size, the solution is a positive nonsimple liquid. Further, with solutions exhibiting the properties of shear hardening, viscoelasticity, and positive nonsimplicity, the relative quantitative activity of the solution may be measured by the area between the curve representing the viscosity response of the solvent and the curve representing the viscosity response of the solution at an arbitrarily chosen gap size. One useful gap size is 0.123 centimeter between concentric cylinders having radii of 1.257 and 1.380 on a U.L. adapter of a Brookfield Model LVT Synchro-Lectric Viscometer having variable rate of rotation.

The properties of shear hardening, viscoelasticity, and positive nonsimplicity also can be determined by flowing a liquid through models or core samples of subterranean formations having different permeabilities. Such models may be connected in parallel to simulate strata of differing permeabilities in a subterranean formation. In these models, apparent viscosity can be measured as a function of shear rate. Such determinations carried out in the models or core samples are time consuming and the use of a rotational viscometer is preferred to delineate liquids having the properties of shear hardening, viscoelasticity, and positive nonsimplicity.

In the practice of the invention, the requisite concentration, as discussed hereinafter, of the additive system is incorporated into water to form the active solution. The term "water" is used herein to include dilute aqueous solutions such as surface water, well water, rain water, city water, treated waste water, and suitable oil field brines. Where brine is employed to prepare the active solution, it may contain up to 2.5 percent by weight of sodium chloride. However, brine containing a greater amount of sodium chloride is desirably not employed since a concentration of strong-electrolyte-forming salts greater than about 2.5 percent by weight tends to destroy the activity of the active solution.

As noted hereinbefore, each of the additive systems requires as one constituent at least one of the soaps of tall oil acid. Tall oil acid is commercially available as "tall oil fatty acid," a refined tall oil acid. The soaps of tall oil acid are readily prepared by reacting the acid with a base. After preparation, the soap may be added to the water to prepare the active solution. On the other hand, the reaction of preparing the soap may be carried out by adding the appropriate amount of the acid and at least an equimolar amount of the base directly to the water to form the active solution. The base may be a strongly ionizing base such as the alkali metal hydroxides. Alternatively, the base may be a weakly ionizing base such as ammonium hydroxide. Alternatively, the base may be relatively nonionizing. Illustrative of such relatively nonionizing bases are the amines, e.g., methylamine, ethylamine or higher amines such as sec-butylamine. Crude tall oil acid can be reacted with a base to form the desired soap. However, crude tall oil acid often contains finely suspended solids which appear as contaminants in the soap. It is therefore preferred to use distilled tall oil to prevent contamination of the resulting soap or ultimately of the active solution with the finely suspended solids.

The particular soap of tall oil acid chosen will determine the additive system required to form an active solution. If the base used to neutralize the tall oil acid is a strongly ionizing base, such as sodium hydroxide, the resulting soap of tall oil acid will require the presence of a strongly ionizing salt to form an active solution in water. By strongly ionizing salt is meant a salt which will form a strong electrolyte in water. A strong electrolyte is discussed and its requirements set forth at page 506 of Outlines of Physical Chemistry, Farrington Daniels; John Wiley & Sons, Inc., New York, 1948. Soluble inorganic salts are illustrative of salts which form strong electrolytes. The alkali metal halides typify such inorganic salts. Sodium chloride is the preferred salt. Illustrative of other inorganic salts which form strong electrolytes is tetrasodium pyrophosphate. Mixtures of the foregoing salts may also be used in the additive system.

When tall oil acid is neutralized with a weakly ionizing base such as ammonium hydroxide, the resulting soap requires the presence of a material which will form at least a weak electrolyte. An example of a material which forms a weak electrolyte in water is ethylamine hydrochloride. Another example of a satisfactory material is ammonia or ammonium hydroxide which may be used with the resulting soap to create an active solution when added to water. Materials, such as inorganic salts, which form stronger electrolytes also may be employed in creating active solutions with the ammonium soap of tall oil acid.

When the tall oil acid is neutralized with a relatively nonionizing basic compound, such as an amine, the resulting soap does not require the presence of a supplementary salt or material to create an active solution when added to water in appropriate concentrations. However, the water used to prepare the active solution may contain materials which form either weak or strong electrolytes. For example, as noted earlier, brines containing up to about 2.5 percent by weight of sodium chloride may be used to prepare the active solution.

The particular water-soluble soap of tall oil acid which is used should be incorporated into the aqueous solution in an amount between 0.1 and 1.0 percent by weight.

A molar concentration of from 0.46 to 0.77 mol percent of a salt which forms a strong electrolyte in water is incorporated into the aqueous solution of the alkali metal soap of tall oil acid to form the active solution used in the method of the invention. The molar concentration of 0.46 to 0.77 is equivalent to 1.5 to 2.5 percent by weight of sodium chloride, which is, as previously indicated, the preferred alkali metal salt forming a strong electrolyte. The lowest interfacial tension and greatest activity are obtained at a concentration of about 2.0 percent by weight of sodium chloride in the active solution.

A molar concentration of from 0.0068 to 0.77 mol percent of a material which forms at least a weak electrolyte in water is incorporated into the aqueous solution of the ammonium soap of tall oil acid to form an active solution. Preferably, a concentration of from 0.01 to 0.11 mol percent is employed. The above molar concentrations of 0.0068, 0.01, 0.11, and 0.77 mol percent are approximately equivalent to concentrations of 0.03, 0.05, 0.5, and 3.5 percent by weight of ethylamine hydrochloride. When a strongly ionizing salt such as an alkali metal halide is used in conjunction with the ammonium tall oil soap to create an active solution, it is preferred that the concentration of the strongly ionizing salt be limited to less than twice the concentration of the ammonium tall oil soap, i.e., no more than 0.5 percent sodium chloride should be present when 0.25 percent of the ammonium tall oil soap is used to create the active solution.

The active solutions used in the method of the invention retain their activity between pH's of about 9 to about 12.5. The pH at which the active solutions are the most active is about 10.5. This optimum pH may be achieved simply by adding to the aqueous solution an excess of the base used to neutralize the tall oil acid. Alternatively, the optimum pH may be achieved by the addition of caustic, such as an alkali metal hydroxide or carbonate, to the active solution. The amount of alkali metal hydroxide or alkali metal carbonate added should be less than about 0.5 percent by weight of the active solution. When caustic up to 0.5 percent by weight is used, it is preferred that it be sodium carbonate which will buffer the pH at the optimum of about 10.5.

The active solutions may be employed and will remain active in the temperature range of most subterranean formations wherein flooding operations are carried out. The higher concentrations in the range set out above are employed in deeper formations having higher temperatures. Even higher concentrations may be used to extend the activity of the solutions at still more elevated temperatures, for example, greater than 60° C.

Where a formation is to be treated by injecting floodwater into the formation, the particular additive system employed may be incorporated in only a portion of the floodwater to create a slug or slugs of active solution. The slug should have a volume of from 0.1 to 30 percent, preferably 1 to 10 percent, of the pore volume of the formation. The slug of active solution is injected through the injection well and passed into the formation. The slug may be driven into the formation by injecting behind it a driving fluid such as water or natural gas. Such a slug may be injected only once or may be injected alternately with a volume of driving fluid, preferably having at least the same volume as the slug and preferably being untreated water, between alternate slugs of active solution to achieve the desired recovery of oil from the subterranean formation. Instead of untreated water, water having lower concentrations of an additive system and hence less activity as a shear hardening, positive nonsimple liquid, may be used between alternate slugs of active solution. Each slug of active solution tends to even out the flow, to alter the pressure gradients, and more nearly to compensate for permeability stratification in the formation. Hence, the greater the number of treated slugs, the more effective will be the flood. This is, of course, more expensive and the particular formation will dictate the economics of the amount and frequency of the slugs which are to be injected, ranging from only one slug to treating all of the flooding water.

It is possible to precipitate a divalent salt, such as the calcium salt of tall oil acid, if the active solutions employed in the invention come in contact with formation liquids containing certain divalent ions, such as calcium. It is preferred to take steps to prevent such precipitation. One way to prevent such precipitation is to inject a slug of from 0.01 to 10.0 percent or more of a pore volume of water in advance of the active solution. The water will build up a bank and miscibly displace the aqueous formation liquids containing the divalent ions, thus preventing contact of the active solution with the aqueous formation liquids.

Another way to prevent such precipitation of a calcium salt of tall oil acid is to incorporate into the active solution a chelating or sequestering agent, such as tetrasodium salt of ethylenediaminetetraacetic acid, sold commercially as sodium Versenate, or sodium phosphate glass, commonly called sodium hexametaphosphate, and sold commercially as Calgon. Other chelating or sequestering agents include the soluble phosphates such as sodium hexametaphosphate or sodium pyrophosphate. The amount of chelating agent should be at least 0.1 percent by weight. Where sodium chloride is present, or may become present, in the active solution, the total concentration of sodium chloride and chelating agent preferably will not exceed about 2.5 percent by weight. Generally, the amount of chelating agent employed is less than about 1.5 percent by weight. On the other hand, with amounts of sodium chloride less than 1.0 percent by weight, greater amounts of chelating agent may be employed. Alternatively, a slug of from 0.01 to 1.0 percent of a pore volume of an aqueous solution of the chelating or sequestering agent may be injected into the formation ahead of the positive nonsimple liquid.

If desired, both ways of preventing precipitation may be combined. Thus, a slug of water may be injected into the injection well and passed into the formation, followed by a slug of the chelating agent, prior to the active solution. If the active solution is injected in a slug following the slug of water and the slug of chelating agent in solution, it will be passed through the formation by injecting thereafter a driving fluid such as water. In the event that subsequent slugs of active solution are injected, it is unnecessary to inject the chelating agent or a separate slug of fresh water in advance of such slugs of active solution.

Thus, the invention provides a method of recovering oil wherein an active solution is injected into the subterranean formation to displace the oil within the formation. Each of the additive systems is economical and readily available and is easily incorporated in water to form an active solution. The solution remains active for prolonged periods of time and retains its activity even when intimately mixed with hydrocarbons. The active solution achieves all the advantages of a viscoelastic, shear hardening, positive nonsimple liquid. It also serves to reduce the interfacial tensions with most crude oils such that at the high injection velocities in the vicinity of the injection well all of the in-situ crude oil is displaced from the interstices of the formation, resulting in less liquid blocking of the formation adjacent the injection well.

Having thus described my invention, it will be understood that such description has been given by way of illustration and example and not by way of limitation, reference for the latter purpose being had to the appended claims.

What is claimed is:

1. In a method of treating a subterranean formation, the step comprising passing into said formation water having incorporated therein a quantity sufficient to provide a solution which is viscoelastic and is also a shear hardening, positive nonsimple liquid of an additive system selected from the class consisting of:
    (a) alkali metal soap of tall oil acid and a salt which forms a strong electrolyte in water,
    (b) ammonium soap of tall oil acid and a material which forms at least a weak electrolyte in water, and
    (c) an amine soap of tall oil acid.

2. In a method for the recovery of oil from a subterranean formation by injecting at least one fluid through an injection well and into said formation and producing oil from said formation through a production well, the improvement comprising passing into said formation water having incorporated therein a quantity sufficient to provide a solution which is viscoelastic and is also a shear hardening, positive nonsimple liquid of an additive system selected from the class consisting of:
    (a) alkali metal soap of tall oil acid and a salt which forms a strong electrolyte in water,
    (b) ammonium soap of tall oil acid and a material which forms at least a weak electrolyte in water, and
    (c) a substituted ammonium soap of tall oil acid.

3. The method of claim 2 wherein said solution is at a pH of between about 9 and about 12.

4. The method of claim 3 wherein said pH is about 10.5.

5. The method of claim 2 wherein said additive system in said solution comprises an alkali metal soap of tall oil acid and a salt which forms a strong electrolyte in water.

6. The method of claim 5 wherein said salt which forms a strong electrolyte in water is in a concentration of from 0.46 to 0.77 mol percent of said solution.

7. The method of claim 5 wherein said salt which forms a strong electrolyte in water is an alkali metal halide.

8. The method of claim 7 wherein said alkali metal halide is sodium chloride.

9. The method of claim 8 wherein said sodium chloride is in a concentration of from 1.5 to 2.5 percent by weight of said solution.

10. The method of claim 5 wherein said alkali metal soap of tall oil acid is sodium soap of tall oil acid.

11. The method of claim 5 wherein said alkali metal soap of tall oil acid is in a concentration of from 0.1 to 1.0 percent by weight of said solution.

12. The method of claim 2 wherein said additive system in said solution comprises ammonium soap of tall oil acid and a material which forms at least a weak electrolyte in water.

13. The method of claim 12 wherein said material which forms at least a weak electrolyte in water is in a concentration of from 0.0068 to 0.77 mol percent of said solution.

14. The method of claim 13 wherein said material which forms at least a weak electrolyte in water is in a concentration of from 0.01 to 0.11 mol percent of said solution.

15. The method of claim 12 wherein said material which forms at least a weak electrolyte in water is selected from the group consisting of ethylamine hydrochloride, ammonia, ammonium hydroxide, and sodium chloride.

16. The method of claim 12 wherein said ammonium soap of tall oil acid is in a concentration of from 0.1 to 1.0 percent by weight of said solution.

17. The method of claim 2 wherein said additive system in said solution is an amine soap of tall oil acid.

18. The method of claim 17 wherein said amine soap of tall oil acid is in a concentration of from 0.1 to 1.0 percent by weight of said solution.

19. The method of claim 17 wherein said amine soap of tall oil acid is sec.-butylamine tall oil soap.

20. In a method for the recovery of oil from a subterranean formation by injecting a flooding liquid through an injection well and into said formation and producing oil from said formation through a production well, the improvement comprising the steps of injecting a slug of active solution comprising water and sufficient quantity of an additive system to create a viscoelastic, shear hardening, positive nonsimple liquid, said additive system being selected from the class consisting of:
  (a) alkali metal soap of tall oil acid and a salt which forms a strong electrolyte in water,
  (b) ammonium soap of tall oil acid and a material which forms at least a weak electrolyte in water, and
  (c) an amine soap of tall oil acid,
said slug of active solution having a pH between about 9 and about 12 and having a volume of about 0.1 to 30 percent of the pore volume of said formation, and thereafter injecting a driving fluid through said injection well into said formation whereby said oil in said formation is displaced by said active solution which is in turn displaced by said driving fluid.

21. The method of claim 20 wherein said slug of said active solution has a volume of about 1 to about 10 percent of the pore volume of said formation.

22. The method of claim 20 wherein said driving fluid is water.

23. The method of claim 20 wherein said driving fluid is natural gas.

24. The method of claim 20 wherein said slug of said active solution is injected alternately with slugs of at least equal volume of said driving fluid.

25. A method of recovering oil from an oil-containing subterranean formation having completed therein an injection means comprising at least one injection well and a production means comprising at least one production well, comprising the steps of:
  (a) injecting through said injection means a slug of from 0.01 to 10.0 percent pore volume of water,
  (b) injecting through said injection means a slug of from 0.01 to 1.0 percent pore volume of an aqueous solution containing from 0.1 to 1.5 percent by weight of a chelating agent selected from the class consisting of tetrasodium ethylenediaminetetraacetic acid and sodium hexametaphosphate,
  (c) injecting through said injection means a slug of from 1 to 10 percent pore volume of an active solution comprising water having incorporated therein an additive system in a quantity sufficient to create a viscoelastic, shear hardening, positive nonsimple liquid, said additive system being selected from the class consisting of:
    (1) alkali metal soap of tall oil acid and a salt which forms a strong electrolyte in water,
    (2) ammonium soap of tall oil acid and a material which forms at least a weak electrolyte in water, and
    (3) a substituted ammonium soap of tall oil acid,
  (d) injecting through said injection means water to drive the foregoing liquids toward said production means, and
  (e) simultaneously producing the oil displaced from within said formation through said production means.

References Cited by the Examiner

UNITED STATES PATENTS

| | | | |
|---|---|---|---|
| 2,670,048 | 2/1954 | Menaul | 166—42 X |
| 2,825,409 | 3/1958 | Ring | 166—42 |
| 3,170,514 | 2/1965 | Harvey et al. | 166—9 |

References Cited by the Applicant

UNITED STATES PATENTS

| | | |
|---|---|---|
| 2,233,382 | 2/1941 | De Groote et al. |
| 2,341,500 | 2/1944 | Detling. |
| 2,604,947 | 7/1952 | Martin. |
| 2,927,639 | 3/1960 | Schuessler et al. |

OTHER REFERENCES

Outlines of Physical Chemistry, Farrington Daniels, John Wiley and Sons, Inc., New York, 1948, page 506.

CHARLES E. O'CONNELL, *Primary Examiner.*

S. J. NOVOSAD, *Assistant Examiner.*